United States Patent Office 3,523,881
Patented Aug. 11, 1970

3,523,881
INSULATING COATING AND METHOD
OF MAKING THE SAME
Robert G. Hirst and Paul V. Voloscove, Pittsfield, Mass., assignors to General Electric Company, a corporation of New York
No Drawing. Filed Sept. 1, 1966, Ser. No. 576,558
Int. Cl. B01k *5/02;* C23b *13/00;* H01f *1/18*
U.S. Cl. 204—181
10 Claims

ABSTRACT OF THE DISCLOSURE

Insulating coating is provided on silicon steel sheet by applying a first coating of colloidal silica or colloidal alumina, electro-depositing thereon a coating of calcium hydroxide, and heating the thus coated sheet at elevated temperature to form a final coating of calcium metasilicate or calcium aluminum silicate.

---

The present invention relates to coated metallic sheet material and to a method of making the same. More particularly, the invention concerns electrically insulating coatings for magnetic sheet material, and to an improved process for applying such coatings.

In McQuade Pat. 3,054,732, there is disclosed a process of electrolytic deposition of alkaline earth hydroxides (such as magnesium and calcium hydroxides) on silicon steel sheet material which is then heated at elevated temperature to provide a refractory silicate insulating coating, resulting from the reaction between the hydroxide and the silicon in the steel. In such process it was found that calcium silicate coatings resulting from the use of calcium compounds were substantially superior in insulating properties to magnesium silicate coatings obtained from electrolytic deposition of magnesium compounds. However, such calcium silicate coatings had the disadvantage that they caused excessively high electrical losses in the operational use of the coated silicon steel, due apparently to undesirable strain induced in the steel by the coating.

It is an object of the invention to provide an improved process of producing insulating coatings on electrical silicon steel which avoid the above-mentioned disadvantage.

It is a particular object of the invention to provide a refractory insulating coating on electrical silicon steel which has excellent insulating properties as well as low electrical loss characteristics, and a process of producing such insulated electrical steel.

Other objects and advantages will become apparent from the following description and the appended claims.

With the above objects in view, the present invention relates to a method of producing electrically insulated magnetic silicon steel sheet material which comprises providing on silicon steel sheet material a first coating of a material selected from the group consisting of colloidal silica and colloidal alumina, applying a second coating of calcium hydroxide on the silicon steel sheet material, and heating the thus-coated sheet material at elevated temperature to react the calcium hydroxide with the colloidal material to form a refractory coating consisting essentially of a compound selected from the group consisting of calcium metasilicate and calcium aluminum silicate.

Investigations made in the course of work leading to the invention showed that the calcium coating produced with the aforementioned McQuade process was actually β calcium orthosilicate and that this coating, while affording good insulation properties, induced strain in the steel which caused excessive losses. It was found in accordance with the invention that this difficulty could be readily overcome by depositing an intermediate layer of colloidal silica or colloidal alumina on the steel surface prior to the electrolytic application of a calcium hydroxide coating.

As disclosed in the McQuade patent, the latter coating may be provided by electrolysis of an aqueous solution of a soluble calcium salt such as calcium nitrate and calcium halides such as calcium chloride. Calcium nitrate has proved exceptionally satisfactory and is preferred for use in depositing the calcium hydroxide coating.

The colloidal silica which may be used for the intermediate coating is in the form of an aqueous solution containing $SiO_2$ in an extremely finely divided form made by an ion exchange technique. Colloidal silica is available commercially under the trademark of Ludox, a product of E. I. du Pont de Nemours & Company, which is an aqueous colloidal sol containing approximately 30% $SiO_2$ with less than 0.5% $Na_2O$ as a stabilizer. A more detailed description of this colloidal silica is found in Robinson Pat. 2,809,137, which description is incorporated herein by reference.

The colloidal alumina material which may alternatively be used in practicing the invention is a dispersion in water of alumina particles which are sufficiently finely divided to provide a colloidal sol in water. A colloidal form of alumina available commercially which may be used is sold under the trademark Baymal, a product of E. I. du Pont de Nemours & Company. This is a white, free-flowing powder consisting of minute fibrils of boehmite (AlOOH) alumina and which disperses readily in water to yield a colloidal sol. Further detailed descriptions of this material and colloidal sols thereof and methods of making them are set forth in the patent to Bugosh 2,915,475. In general, for the purposes of this invention a concentration of 5–50 grams per liter of water of the finely divided colloidal alumina has been found suitable, with a range of 30–40 grams/liter affording optimum results.

In a typical procedure which may be employed in practicing the invention, the silicon steel sheet to be coated (which contains about 2–5% silicon in a usual type of electrical silicon steel) is heated to a temperature of about 100–200° C., preferably about 150° C., and the heated surface is then sprayed with colloidal silica, using any conventional or suitable spraying apparatus, so as to provide a smooth, uniform coating of about .005–.020 oz./ft.² of the colloidal material, preferably about .012 oz./ft.². The thus-coated sheet, after drying, is then placed in an electrolytic bath comprising an aqueous calcium nitrate solution (preferably containing enough calcium oxide to keep the solution basic) and, with the coated sheet as the cathode, current is applied at a sufficient current density for a sufficient period to deposit a calcium hydroxide coating about .05 to .2 mil thick on the silicon steel sheet. The thus-coated sheet is then removed from the electrolytic bath and subjected to a high temperature anneal above about 1000° C., and preferably in the range of 1150 to 1175° C. This heat treatment produces a glasslike coating of calcium metasilicate according to the following reactions:

$$Ca(OH)_2 + heat \rightarrow CaO + H_2O$$

$$2CaO + SiO_2 \rightarrow Ca_2SiO_4$$

$$\beta Ca_2SiO_4 + SiO_2 \rightarrow 2CaSiO_3$$

In the case where colloidal alumina is used, the following reactions apply:

$$Ca(OH)_2 + heat \rightarrow CaO + H_2O$$

$$2CaO + Al_2O_3 + SiO_2 \rightarrow Ca_2Al_2SiO_7$$

In the latter reaction, the $SiO_2$ is derived from the silicon in the steel.

Instead of applying the colloidal material by spraying, the steel sheet may simply be dipped in the colloidal suspension. Other methods of applying this material may also be found satisfactory.

In the case where colloidal alumina (Baymal) is used, it is advantageous to add sufficient calcium oxide to the colloidal sol, as well as to the electrolyte bath, to make these mixtures basic, it having been found that this condition in the case of the colloidal sol avoids the tendency of the steel to rust prior to the annealing stage, and in the case of the electrolytic deposition results in improved adherence of the applied coating.

The following examples will illustrate the process of the invention, it being understood that the invention is not intended to be limited thereby:

EXAMPLE I

Commercial Ludox (colloidal silica) diluted with water to a 50% by weight solution was sprayed on silicon steel strips pre-heated to 150° C., and the resulting coating was dried. A silica coating of about .012 oz./ft.$^2$ was produced. The thus-coated steel strips were then arranged as the cathode in an electrolytic bath composed of a 2.0 molar aqueous solution of calcium nitrate containing sufficient calcium oxide to make it basic and, using an aluminum anode and applying a current density of 50 amps/ft.$^2$, an adherent coating of calcium hydroxide was deposited on the silica-coated strips by the electrolytic deposition process, which was carried on for 15 seconds. The combined coating weight after drying was about .033 oz./ft.$^2$. The thus-coated strips were then annealed in a hydrogen atmosphere for 8 hours at 1150° C. The annealed coating thus produced was identified by X-ray diffraction analysis as calcium metasilicate ($\alpha CaSiO_3$).

The average Franklin (electrical insulation) value of the ten steel strips thus coated was found to be .12 amps, which represents excellent electrical insulation characteristics. The average watts loss was found to be .532 watt per pound, which is a relatively low value and is less than the average watts loss found with similar samples used as controls having no coating thereon.

EXAMPLE II

A colloidal sol was prepared by mixing Baymal in water in the proportions of 30 grams of the Baymal powder to one liter of water, sufficient calcium oxide being added to make the sol basic. This colloidal alumina sol was sprayed on silicon steel strips pre-heated to 150° C. and the resulting coating was dried, producing an alumina coating having an average weight of about .012 oz./ft.$^2$. The thus-coated strips were subjected to electrolytic deposition of calcium hydroxide using the process and equipment of Example I. The combined dried coating weight averaged .032 oz./ft.$^2$ for the coated strips. The thus-coated strips were then annealed in a hydrogen atmosphere at 1150° C. for 8 hours. The resulting coating was found by X-ray diffraction analysis to be calcium aluminum silicate.

The average Franklin values of the thus-coated steel strips was found to be .09 amp and the watt loss was .535 watt/lb. The latter value compared favorably with the .545 watt/lb. value for uncoated silicon steel strips used as controls.

In tests made on several samples of silicon steel strips coated in accordance with the invention, it was found that the residual sulfur remaining in the steel after anneal was extremely low, indicating that the coatings (both of the colloidal silica and colloidal alumina forms) do not prevent diffusion of the sulfur out of the steel during the annealing treatment. In this respect, they were as beneficial as calcium hydroxide coatings used alone, and provided better results than obtained with electrolytically deposited magnesium hydroxide coatings presently in commercial use.

While the present invention has been described with reference to particular embodiments thereof, it will be understood that numerous modifications may be made by those skilled in the art without actually departing from the scope of the invention. Therefore, it is intended herein to cover all such modifications as come within the true spirit and scope of the invention.

What we claim as new and desire to secure by Letters Patent of the United States is:

1. The method of producing electrically insulated magnetic silicon steel sheet material which comprises providing on silicon steel sheet material a first coating of a material selected from the group consisting of colloidal silica and colloidal alumina, applying a second coating of calcium hydroxide on said silicon steel sheet material, and heating the thus-coated sheet material at elevated temperature to react said calcium hydroxide with said colloidal material to form a refractory coating consisting essentially of a compound selected from the group consisting of calcium metasilicate and calcium aluminum silicate.

2. The method as defined in claim 1, said second coating being applied by electrolyzing an aqueous solution of a water soluble salt of calcium with said silicon steel sheet material arranged as the cathode in said solution.

3. The method as defined in claim 2, wherein said first coating material consists essentially of colloidal silica and said refractory coating consists essentially of calcium metasilicate.

4. The method as defined in claim 2, wherein said first coating material consists essentially of colloidal alumina and said refractory coating consists essentially of calcium aluminum silicate.

5. The method as defined in claim 2, said elevated temperature being at least about 1000° C.

6. The method as defined in claim 2, said first coating material being applied by spraying the same on said silicon steel sheet material.

7. The method as defined in claim 6, said silicon steel sheet material being heated to a temperature of about 100–200° C. prior to said spraying step.

8. The method as defined in claim 2, said first coating material being applied by dipping said silicon steel sheet material therein.

9. Electrically insulated silicon steel sheet material having a refractory coating thereon consisting essentially of a compound selected from the group consisting of calcium metasilicate and calcium aluminum silicate, said insulated silicon steel sheet material made by the process defined in claim 1.

10. Electrically insulated silicon steel sheet material having a refractory coating thereon consisting essentially of a compound selected from the group consisting of calcium metasilicate and calcium aluminum silicate, said insulated silicon steel sheet material made by the process defined in claim 2.

References Cited

UNITED STATES PATENTS

| | | | |
|---|---|---|---|
| 1,309,214 | 7/1919 | Moore | 204—56 |
| 1,846,844 | 2/1932 | Clark | 117—135.1 |
| 1,902,493 | 3/1933 | Dantsizen | 204—28 XR |
| 1,982,179 | 11/1934 | Scharschu | 154—43 |
| 2,327,462 | 8/1943 | Ruben | 204—181 |
| 2,650,975 | 9/1953 | Dorst | 204—181 XR |
| 2,787,966 | 4/1957 | Lyons | 117—135.1 XR |
| 3,027,313 | 3/1962 | Halstead et al. | 204—181 |
| 3,160,509 | 12/1964 | Schaefer et al. | 106—63 |
| 3,276,923 | 10/1966 | McQuade | 117—135.1 XR |
| 3,320,082 | 5/1967 | McMahon et al. | 117—135.1 XR |
| 2,492,682 | 12/1949 | Carpenter et al. | 148—6.35 |
| 3,014,825 | 12/1961 | Harendza-Harinxma | 148—104 |
| 3,054,732 | 9/1962 | McQuade | 204—37 |
| 3,106,496 | 10/1963 | Anolick | 148—112 |

(Other references on following page)

| | | | |
|---|---|---|---|
| 3,132,056 | 5/1964 | McQuade | 148—31.5 |
| 1,940,707 | 6/1931 | Browne | 117—169 |
| 2,529,373 | 11/1950 | Campbell et al. | 148—14 XR |
| 3,301,702 | 1/1967 | Ames et al. | 117—135.1 |

FOREIGN PATENTS 518,554   2/1940   Great Britain.

JOHN H. MACK, Primary Examiner

W. VAN SISE, Assistant Examiner

U.S. Cl. X.R.

117—62, 135.1; 148—14, 13.1, 31.5, 110, 113

PO-1050
(5/69)

UNITED STATES PATENT OFFICE
CERTIFICATE OF CORRECTION

Patent No. _____U.S. 3,523,881_____ Dated___August 11, 1970___

Inventor(s)_____Robert G. Hirst and Paul V. Voloscove_____

It is certified that error appears in the above-identified patent and that said Letters Patent are hereby corrected as shown below:

Col. 1, line 65, "silicate" should be inserted after the word - calcium -

SIGNED AND
SEALED
OCT 20 1970

(SEAL)
Attest:

Edward M. Fletcher, Jr.
Attesting Officer

WILLIAM E. SCHUYLER, JR.
Commissioner of Patents